(12) United States Patent
Balasubramanian et al.

(10) Patent No.: US 6,954,287 B1
(45) Date of Patent: Oct. 11, 2005

(54) GAMUT MAPPING PRESERVING LOCAL LUMINANCE DIFFERENCES WITH ADAPTIVE SPATIAL FILTERING

(75) Inventors: Thyagarajan Balasubramanian, Webster, NY (US); Ricardo L. de Queiroz, Pittsford, NY (US); Reiner Eschbach, Webster, NY (US); Wencheng Wu, Tan-Tzu (TW)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/435,256

(22) Filed: Nov. 5, 1999

(51) Int. Cl.$^7$ .............................................. G06F 15/00
(52) U.S. Cl. ..................... 358/1.9; 382/261; 382/162; 382/167; 382/166; 345/590
(58) Field of Search ................... 358/1.9; 382/261, 382/162, 167, 166; 345/590

(56) References Cited

U.S. PATENT DOCUMENTS

| | | | |
|---|---|---|---|
| 5,450,216 A | | 9/1995 | Kasson ........................ 358/518 |
| 5,497,249 A | * | 3/1996 | Koizumi et al. ............ 358/462 |
| 5,579,031 A | | 11/1996 | Liang .......................... 345/154 |
| 5,666,436 A | * | 9/1997 | Eames ......................... 382/167 |
| 5,790,195 A | * | 8/1998 | Ohsawa .................... 348/419.1 |
| 5,812,702 A | * | 9/1998 | Kundu ......................... 382/260 |
| 5,818,964 A | * | 10/1998 | Itoh ............................. 382/205 |
| 5,822,467 A | * | 10/1998 | Lopez et al. ................ 382/261 |
| 5,883,632 A | | 3/1999 | Dillinger ..................... 345/431 |
| 5,903,275 A | | 5/1999 | Guay .......................... 345/430 |
| 5,907,415 A | * | 5/1999 | Yabe ........................... 358/518 |
| 6,044,178 A | * | 3/2000 | Lin ............................. 382/260 |
| 6,198,843 B1 | * | 3/2001 | Nakauchi et al. ........... 382/167 |
| 6,259,811 B1 | * | 7/2001 | Tsuji ........................... 382/166 |
| 6,272,260 B1 | * | 8/2001 | Furukawa et al. .......... 382/261 |
| 6,359,703 B1 | * | 3/2002 | Yabe ........................... 358/1.9 |
| 6,381,361 B1 | * | 4/2002 | Silverbrook et al. ........ 382/162 |

OTHER PUBLICATIONS

J.A. Stephen Viggiano et al., "Color Reproduction Algorithms and Intent", Proceedings of the IS&T/SID 1995 Color Imaging Conference: Color Science, Systems and Applications, Nov. 1995, pp. 152–154.

Hiroaki Kotera et al., Object to Object Color Matchings By Image Clustering, IS&Ts NIP 14: 1998 International Conference on Digital Printing Technologies, Oct. 1998, pp. 310–314.

T. Morimoto et al, "Objects' Color Matchings Based on Image Clustering"; Japan Hardcopy '98, p. 371ff.

R.S. Gentile et al; "A Comparison of Techniques for Color Gamut Mismatch Compensation"; Journal of Imaging Technology, vol. 16, No. 5, Oct. 1990 pp. 176–181.

Edward G. Pariser; "An Investigation of Color Gamut Reduction Techniques"; Published for the IS&T's Second Symposium on Electronic Prepress Technology and Color Proofing held on Sep. 11–13, 1991.

* cited by examiner

Primary Examiner—Edward Coles
Assistant Examiner—Alan Rahimi
(74) Attorney, Agent, or Firm—Mark Costello; Christopher D. Wait

(57) ABSTRACT

A color printing process, printing a color image in which out-of-gamut original colors are present. For each pixel defined by an original color which is determined to be out of gamut, a gamut remapping process is applied to map each pixel to a color which is within a printer gamut, remapping said pixels to colors within an output printer gamut. For a given set of gamut remapped pixels, gamut remapped pixel colors are compared with said original pixel colors, to derive a comparison metric. Using the comparison metric, a corrected set of gamut remapped colors is generated. The comparison metric may be subjected to an adaptive filtering process, which strengthens the comparison metric in high frequency image regions to increase its impact on the gamut remapped colors, and weakens the comparison metric in low frequency areas, to weaken its impact on the gamut remapped colors. The filter is selected by determining a filter selection metric in accordance with measured local image activity and changing filter parameters as a function of the determined filter selection metric.

11 Claims, 6 Drawing Sheets

GAMUT MAPPING PRESERVING LOCAL LUMINANCE DIFFERENCES WITH ADAPTIVE SPATIAL FILTERING

The present invention is directed to improving the selection of printer colors where the original document selects colors that are out of gamut, and more particularly to an out of gamut mapping method that preserves spatially local luminance differences.

CROSS REFERENCE

Cross-reference is made to concurrently filed patent application D/99729, entitled, "Gamut Mapping Preserving Local Luminance Differences", by R. Balusubramanian, R. Dequeiroz, R. Eschbach and K. Braun.

BACKGROUND OF THE INVENTION

Printing devices and display devices all inherently have a region of operation, sometimes referred to as a gamut. Because such image reproduction devices are non-ideal, they cannot reproduce every possible color that can be seen by a human. Gamut mapping is often used because the color range that is possible to reproduce with a particular display is commonly not identical with the color range possible to reproduce with any selected printer. Thus, while both display and printer have a large number of colors that are reproducible by both, there may be certain combinations of sets of color values that are outside the reproduction capability of one or the other. However, images are composed for printing on display devices, and users expect printers to reproduce images with their intent. Furthering the problem, different printing technologies and materials inherently provide different gamuts even among each class of devices.

Gamut mapping serves to map pixels defined by colors not printable by the printer or resulting from initial image processing, into colors printable by a real printer. In doing so, out-of-gamut, unprintable colors are mapped to printable colors in accordance with some scheme designed to maintain color intent and aesthetic appearance. One of the most common schemes is to map any out-of-gamut pixel to its closest in-gamut neighbor. Obviously this is not satisfactory, because in a region of slight color variation, that is out-gamut, a number of similar colors may be mapped to the same in-gamut color. Some textures, highlights and shadows in an original image will be lost.

This problem leads to a generalization that a fundamental problem of traditional gamut mapping processes is that they are pixelwise operations that do not take neighborhood effects into account. Looking at one example, illustrated at FIG. 1, when blue text is placed against a black background, the original monitor or display has no difficulty in providing an image that clearly distinguishes the blue and black regions. However, the highly saturated blue color may be out of gamut of some printers, and black is commonly mapped to the printer's blackest reproduction. For large area reproduction, this maybe entirely acceptable. However, with the colors juxtaposed, looking at a luminance profile as in FIG. 2, the luminance difference is decreased dramatically, rendering the appearance difference on the printed page problematic.

In another example, shown in FIG. 3, a saturated red/green edge that has been processed with JPEG compression and decompression, results in an intermediate yellow color produced at the edge. The stripe of yellow color is not readily visible, however, when its luminance matches its green neighbor. However, as illustrated in FIG. 4, gamut mapping applied to the red/green edge will tend to decrease the luminance of the green side of the edge, while allowing the yellow, which is within gamut, to print at its same luminance level, thus rendering it much more apparent and objectionable.

A similar problem occurs in antialiasing, where edge softening of saturated color edges results in printable colors, and inconsistent out-of-gamut mapping of the saturated colors causes the softened edge to stand out from the background and foreground colors.

U.S. Pat. No. 5,579,031 to Liang describes the use of a printer model in the calibration, where the model is iteratively updated to form a final LUT. While the use of a transform like the LUT described in itself inherently provides color matching between the two devices considered, additional color gamut mapping may be used in the development of the LUT, by performing a preselected mathematical manipulation that maps the input set of color values to lie within the range of values from the printer model. Such mathematical manipulation may be as simple as truncation or as complicated as data compression.

U.S. Pat. No. 5,883,632 to Dillinger describes preservation of relative position by geometric transform on "hue pages". Device-space color specifications for two color presentation devices are interrelated through the intermediary of at least one perceptual color space. This interrelation is performed by either tabulations or real-time software processing, and in such a way that color, and color changes, specified in relation to one device—in a control language of that device—are tracked in both the language and the actual performance of the other device. This mapping through perceptual space can be used to produce the effect of matching the two device gamuts to each other, so that the full gamuts of both are in effect merged. When so used, this new kind of mapping preserves relative positions in color space—and thus the capability of the tracking device to maintain distinctions between colors seen on the source/input device that appear very closely similar. Such discrimination between adjacent colors can be supported essentially throughout the gamut of both devices and in particular even very near the lightness extrema and maximum-saturation point on a hue page.

An article by T. Morimoto et al, "Objects' Color Matchings Based on Image Clustering" (Japan Hardcopy '98 p. 371ff), teaches image segmentation and color mapping for the different objects.

U.S. Pat. No. 5,903,275 to Guay describes a gamut mapping in which saturated colors (i.e., out of gamut colors) are mapped to device saturated values (device printable saturated colors). Colors inside the gamut are mapped to "closest" and other colors to a blend between closest values calorimetrically and saturation. First, the printable colors are measured is some device independent color space, such as L*a*b*. Next, the range of colors from some reference color CRT, consisting of the colors from black to monitor saturates, and the colors between, then from saturates to white, and the colors between, are calculated. The saturates are assigned colors based on what printable color a user would like to get when the user asks for a saturated CRT color. This gives the printer's representation of the outer range of the color gamut of the CRT. Next, a table is generated that subsamples all colors available to the specified color space. This table fills in entries within the color gamut of the target printer with the closest printable color. Colors out of the printer's gamut are represented by an averaging of the printable colors and of the outer range of colors assigned for the saturates. A requested color is converted to the reference color space, then looked up in the table, and the resulting color specification is sent to the printer.

U.S. Pat. No. 5,450,216 to Kasson describes gamut-mapping color images in device-independent form to device-dependent gamut in a perceptual color space. Digital images are mapped to any device-dependent gamut in a manner that minimizes the human visual response both to the luminance and the chrominance changes necessary to force out-of-gamut pixels into the specified device-dependent gamut. A "neighborhood gamut mapping" technique considers the subjective visual effects of nearby pixels on the mapping of each pixel. At low spatial frequencies, image luminance is biased toward the luminance in the device-dependent gamut at which the greatest chroma magnitude is available for a fixed hue angle. Spatial filtering exploits the differing spatial frequency regions of insensitive human visual response to both luminance and chrominance changes.

The references cited herein are incorporated by reference for their teachings.

SUMMARY OF THE INVENTION

In accordance with the present invention there is provided a method of gamut mapping that preserves variations in color within a local neighborhood of pixels in the image.

The present invention seeks to preserve spatially local-luminance variations in the original image, by calculating the difference between the original image luminance and the gamut mapped luminance resulting from using a pixel-based gamut mapping process. A spatial filter is then applied to the difference signal, and the signal is added back to the gamut-mapped signal. The result is a reduction of the artifacts that arise from standard gamut mapping algorithms. The filtering process determines a filter selection metric in accordance with measured local image activity; the filter parameters are varied as a function of the determined filter selection metric.

It is an important aspect of the present invention that the mapping from an input color to an output color is not a unique 1-to-1 mapping as done in standard gamut mapping techniques. Rather the mapping of an individual color depends on its local neighborhood. This means that a specific color, Color1, will be mapped to different output colors as a function of neighboring colors.

The image adaptive procedure described herein modifies the mapping process as a function of the input data. Selecting optimum filter size in the spatial filter used has proven to have a significant effect on the perceived image quality. The invention provides a detection mechanism which varies filter size in accordance with local image data, thereby improving mapping quality.

The invention may take form in various components and arrangements of components, and in various steps and arrangements of steps. The drawings are only for purposes of illustrating a preferred embodiment and are not to be construed as limiting the invention:

Figure 1:
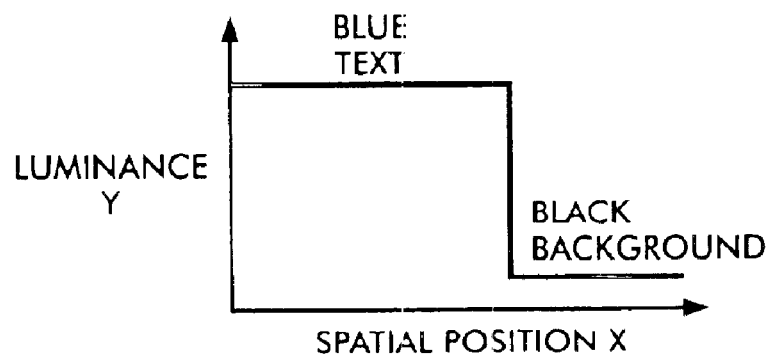
FIGS. 1, 2, 3 and 4 illustrate artifacts generated by out of gamut processing.
Figure 2:
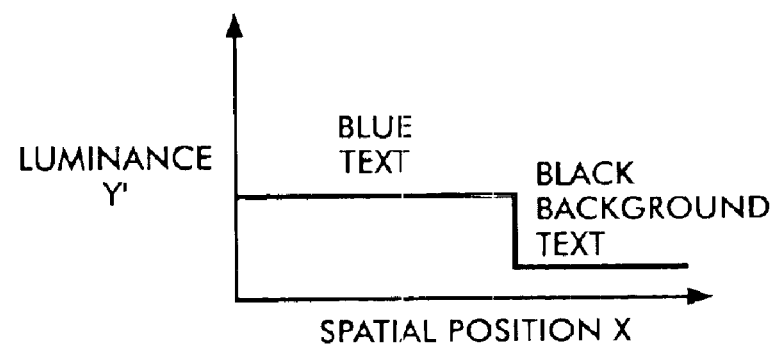
Figure 3:
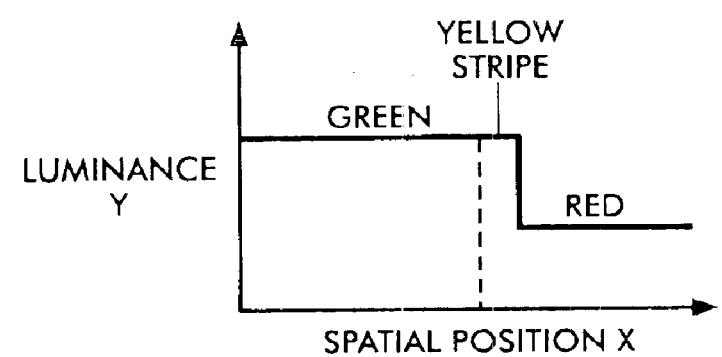
Figure 4:
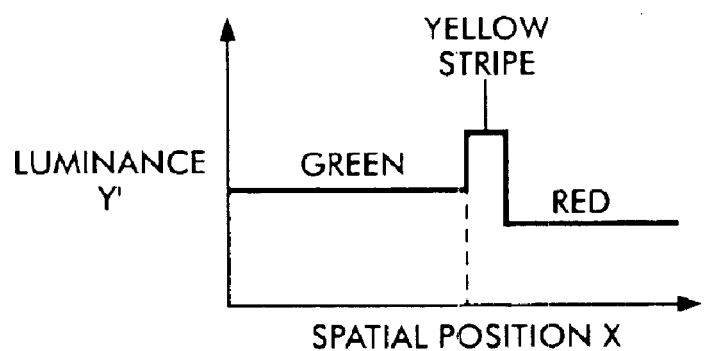
Figure 5:
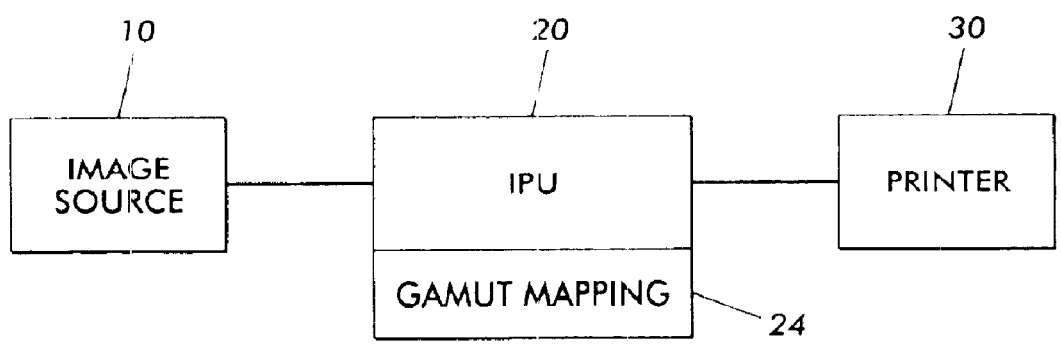
FIG. 5 illustrates a printing system in which the present invention finds advantage.

Referring now to the drawings where the showings are for the purpose of illustrating an embodiment of the invention and not for limiting same, a basic system for carrying out the present invention is shown in FIG. 5. In such a system, a source of original images 10, perhaps a color scanner, a personal computer or workstation with appropriate document or image creation software, a camera or data storage device, produces an image, typically in a device independent manner provides suitable electronic images. The images are defined in pixels, each associated with a color defined in terms of CIE color space L*,a*,b*, or some other luminance-chrominance space (L, C1,C2) or an analytic transform thereof.

An image from image data source 10 is directed to an image processing unit (IPU) 20, which, for the purposes of description includes all of the digital processing requirements to convert an image from its original data representation to a format suitable for printing at printer 30. Depending on the image representation, image decomposition from a PDL, halftoning from gray level images, color transforms, scaling and any other process required, is represented by the IPU 20. IPU 20 can take various forms and operational details, and ranges from dedicated, and hardwired or software driven operation in conjunction with high speed printing devices, to printer drivers running on personal computers or workstations driving personal printers. Called out particularly is the gamut mapping function 24, which will be further described below. It will no doubt be appreciated that the colors may be derived in rgb color space, and readily converted to other device independent color spaces where calculations can more readily be performed. This may readily be part of the functionality of IPU 20.

Printer 30 can be any color printer, printing a plurality of separations which, when superimposed, form a multicolor image. For the purposes of the present invention and its description, the printer functionality could be replaced or arranged in parallel with a display or monitor.

Gamut mapping function 24 serves to map pixels defined by colors not printable by the printer, or resulting from initial image processing, into colors printable by the real printer. In doing so, out-of-gamut, unprintable colors are mapped to printable colors in accordance with some scheme that attempts to optimize retention of the color relationships within the document. Colors that fall within the output gamut may also be adjusted to retain the relationships to the mapped colors.

When referring to calorimetric or device independent spaces, the reference is to color space definitions that are transforms of CIE XYZ space (1931). When we refer to device dependent space, we refer to a color space that is defined only in terms of operation of the device using it. While many color spaces have three dimensions, it is possible to have color spaces with less than three dimensions or more than three dimensions and likewise, it is possible for printers to use less than three colorants or more than four colorants.

In the following discussion, the term "luminance" is used generically to encompass the strict definitions of luminance (i.e., the Y component in XYZ) and lightness (i.e. the L* component in L*a*b*). Chrominance components C1 and C2 are likewise generic manifestations of opponent color signals, or the equivalent polar representations, chroma and hue. It should understood that exact input luminance values cannot always be preserved through the gamut mapping, since this can result in undesirable trade-offs in the other attributes, hue and chroma. The optimum trade-offs in these attributes for various combinations of device gamuts, image types, and rendering intents is not the focus of the invention, and not discussed in detail here.

Initially, it will be assumed that a gamut mapping function G1 is a reasonable pixelwise strategy for large color patches or smooth regions of an image. The invention preserves the characteristics of G1 at low spatial frequencies, while preserving high frequency luminance variations in the original image that G1 may have lost or altered. The second gamut mapping G2 is designed to approximately preserve these luminance variations.

Figure 6:
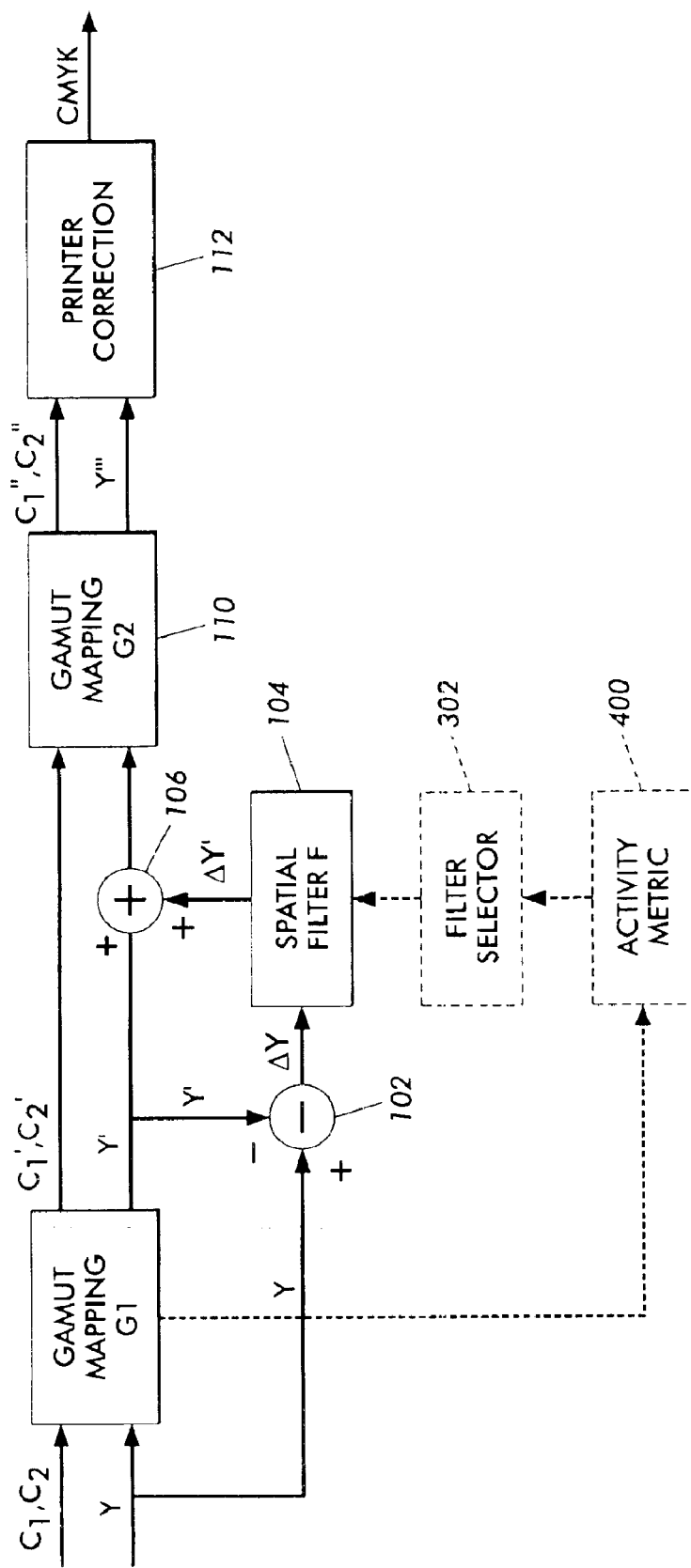
FIG. 6 illustrates a functional block diagram illustrating one environment for the present invention, which may be used in conjunction with the printing system of FIG. 5.

With reference now to FIG. 6, an image defined, for example in Y (luminance), C1, C2 (chrominance space) is originally received and analyzed at gamut mapping function 100, which applies function G1 thereto. As noted, function G1 can be any gamut mapping function, perhaps represented by either an optimized non-linear function, or a simplistic mapping function, where out of gamut pixels are moved to the nearest "in gamut" plane. There are many such functions, and the precise function chosen is not relevant to the invention. The output from the function could be characterized as Y', C1', C2'. From this output, the luminance signal Y' is compared to Y, perhaps in a simple differencing function, 102, producing $\Delta Y$. In general, the other color channels could also be included in the differencing operation. A spatial filter 104 operating on an n×m block of values $\Delta Y$ is used so that the feedback to the gamut mapping function is based on a local area, rather than derived on a pixel by pixel basis. The output of spatial filter 104, $\Delta Y'$, is then used to vary Y' to obtain Y". In this example, $\Delta Y'$ is added to Y' at adder 106. The colors defined by Y", C1', C2' are then subjected to a second gamut mapping function 110, implementing gamut mapping function G2, which may or may not be the same function as G1. The resulting signals are directed on to printer correction function 112, for conversion to device dependent signals preparatory to printing. G1 and G2 may be provided as described in R. S. Gentile, E. Walowit, and J. P. Allebach, *A Comparison of Techniques for Color Gamut Mismatch Compensation*, SPSE/SPIE Symposium on Electronic Imaging, Los Angeles, pp. 176–181; and E. G. Pariser, *An Investigation of Color Gamut Reduction Techniques*, IS&T 2nd Symposium on Electronic Publishing, pp. 105–107, 1991.

Considering possible gamut mapping functions, several are possible and useful in the present application. The design of gamut mapping functions G1 and G2, and the spatial filter 104 can depend on many factors, including global and local image characteristics, device characteristics, rendering intent and preference.

In one possible embodiment, gamut mapping function G1 was chosen to map out-of-gamut colors to the nearest surface point of the same hue, and G2 was chosen to map out-of-gamut colors to a surface point defined by the four steps: I) determine a hue of given out-of-gamut color; ii) calculate cusp point defined as the in-gamut color of maximum chroma at the given hue; iii) determine focal point by projecting the cusp point onto neutral axis while preserving luminance; and iii) mapping the out-of-gamut color to surface in a direction towards the focal point. In this embodiment, for both G1 and G2, in-gamut colors were unaltered. The filter F was chosen to be a linear filter with support over an N×N image block, designed so that at low frequencies, $\Delta Y'=0$, while at high frequencies, $\Delta Y'=\Delta Y$. This is essentially a high pass filter. With these characteristics, the inventive gamut mapping process will approximately reproduce the variations in Y at high spatial frequencies, while reducing to the pixelwise mapping G1 at low spatial frequencies.

The examples illustrate where it is desirable to change the colors predicted by traditional gamut mapping in order to preserve information from the original image. In each case, the output color or colors selected by the proposed algorithm would have been different if the colors were large areas of solid colors. The desire in color reproduction of images is not to reproduce the closest colors to the original, but to reproduce the information and intent of the original.

Figure 7:
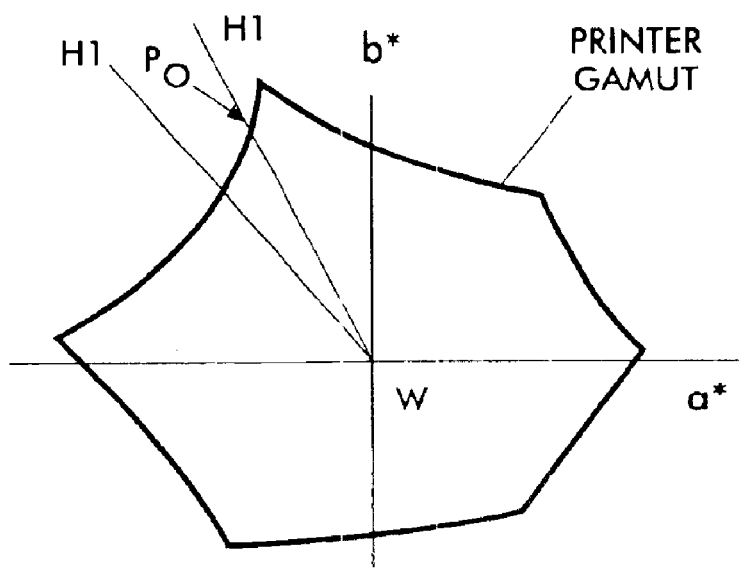
FIG. 7 illustrates a soft hue preserving gamut mapping method useful as a gamut mapping technique.

Other gamut mapping methods include:

With reference to FIG. 7, for a given input color, the hue angle thereof is obtained, and then the input color is mapped to the nearest point on the gamut surface within a range of hues about the input hue angle, where the range is greater than 0 and less than 90 degrees. A given point P, with hue angle H, is mapped to the closest point on the gamut surface within the region bounded by the lines W-H1 and W-H2.

Figure 8:
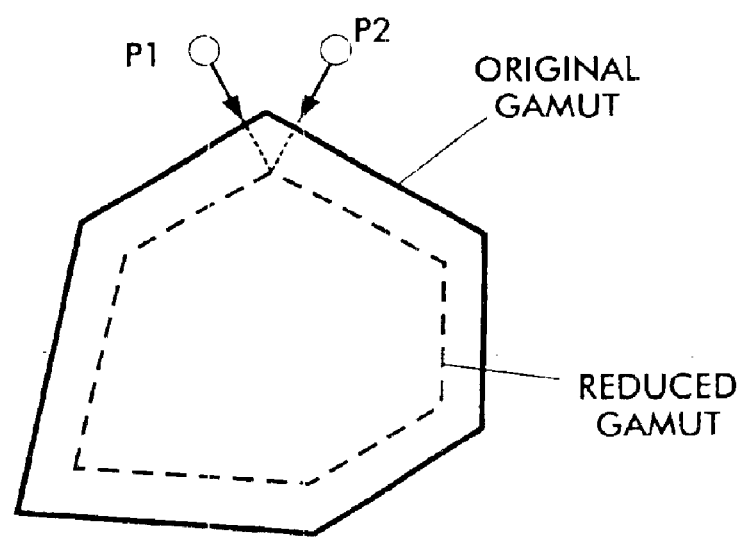
FIG. 8 illustrates a nearest point gamut mapping useful as a gamut mapping technique.

With reference to FIG. 8, a reduced gamut is defined by reducing the chroma of each surface point by a predetermined scale factor. For a given input color, a gamut-mapping vector is defined as the shortest distance to the reduced gamut. Map the input color to the original gamut surface in the direction given by this vector.

Figure 9:
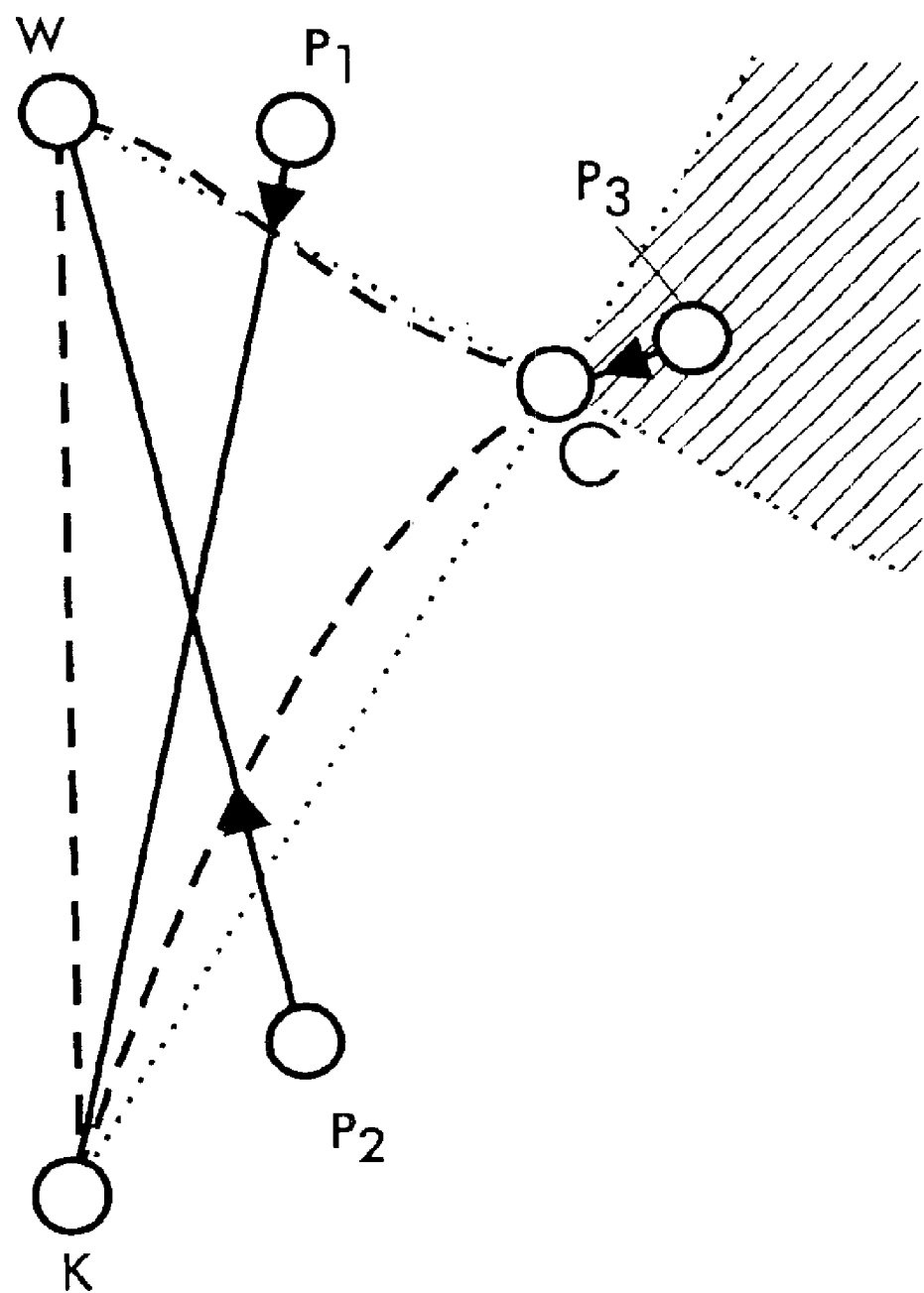
FIG. 9 illustrates a gamut mapping method moving the remapped points towards the provides gamut mapping towards printer black and white.
Figure 10:
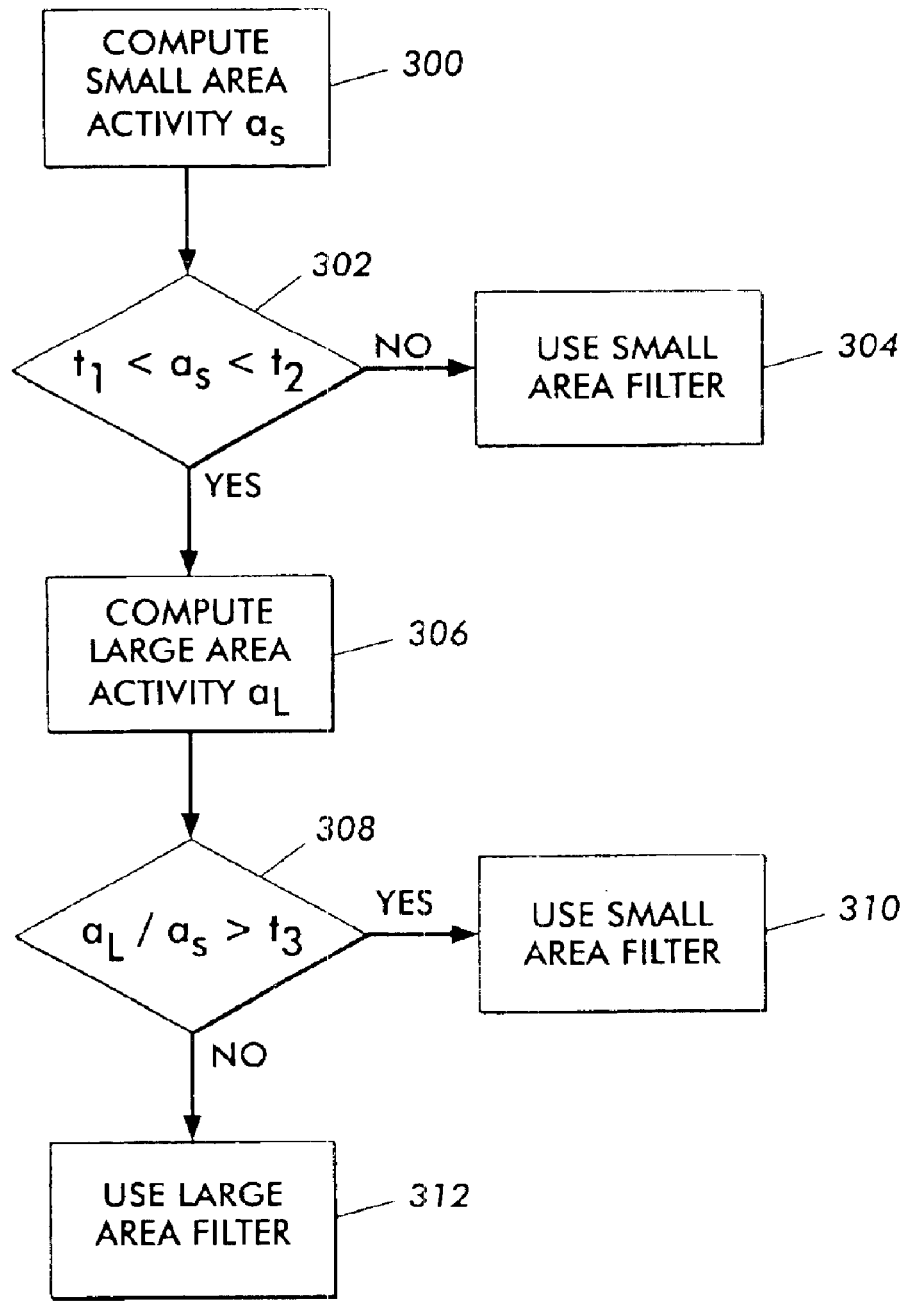
FIG. 10 is a flow-chart illustrating the operation of a linear adaptive spatial filter useful in conjunction with the invention.

With reference to FIG. 9, Point C is defined as the point of maximum chroma in the hue plane of the input color. Drawing two lines, WC from white to C, and KC from black to C. All points in the shaded region (e.g. P3) are mapped to point C. All points outside the shaded region whose lightness is greater than that of C (e.g. P1), are mapped to the surface in a direction towards black K. All points outside the shaded region whose lightness is less than that of C (e.g., P2), are mapped to the surface in a direction towards white W.

Again referring to FIG. 6, the process applies pixelwise gamut mapping G1 to the input colors, and computes a difference image $\Delta Y$ between the luminances of the input and gamut mapped signals. It then adds a filtered version $\Delta Y'$ of this difference back to the gamut mapped signal Y'. This operation might move pixels back out of the gamut, and hence, a second gamut mapping operation G2 is needed to ensure that all colors are within gamut. Note that G1 and G2 need not be the same algorithm.

With reference now to FIG. 6 and spatial filter 104, one possible filter that finds use with respect to the invention is an adaptive linear filter. Using the above gamut mapping process, it can be seen that pictorial images require a large filter footprint in order to have a visual effect. Here "large" refers to roughly 15 to 30 pixels (1-dimensional) for a 300 dpi (dot per inch) printer. Smaller filters are not as effective. Note that in general, it may be desirable to choose F as a nonlinear filter. The simple linear filter was chosen for ease of demonstration. It should also be noted that the filter can optionally have a gain larger than 1 to enhance detail.

On graphical data, however, large filter sizes lead to a distinct and disturbing halo effect around edges. This effect is especially disturbing for text on a colored background. Consequently small filter windows or footprints should be used. When the wrong filter size is used, image quality improvement may not be obtained.

The filter can be adapted to improve its use by changing the filter footprint as a function of the local image data. In this way, the filter function adapts to local image content. It should be noted that one could also change the filter values or coefficients (rather than the footprint). However, variation of the filter footprint is a preferred option, because a fast implementation exists for a simple, constant-weight blur filter.

One way of looking at the filter selection issue can be described in the framework of pictorial vs. graphic data. A closer examination, however, reveals that the issue is connected to the local image data variation in terms of local activity and "noise". Clean edges in the input image data are best mapped using a smaller filter footprint. Noisy and weak edges are best mapped using a large filter footprint. A significant improvement is obtained by using different filter footprints based on local image characteristic. Different local image activity measures can be used, but they all have in common that:

a) Very low activity [flat areas] correspond to a small filter footprint (=1; 5×5 footprint, for example).

b) Medium activity [mild image variations] correspond to a large filter footprint (15×15 footprint, for example).

c) High activity [strong edges] correspond to a small filter footprint (>1; 5×5 footprint selected in the printed example).

The most obvious metric is data norm of order p:

$$a_i^{L,p} = \left[\sum_j (e_i^p - e_j^p)\right]^{\frac{1}{p}}$$

Here, $e_i$ is the luminance error at the center pixel i and $e_j$ is the luminance error at pixel j within the predefined neighborhood of pixel i. The most common forms of this activity measure are:

$$a_i^{L1} = \sum_j |e_i - e_j| \text{ and } a_i^{L2} = \left[\sum_j (e_i^2 - e_j^2)\right]^{\frac{1}{2}}$$

For speed of implementation, we are using a modified activity measure:

$$a_i = \frac{1}{m}\left|\sum_j (e_i - e_j)\right|.$$

The advantage of the above activity measure lies in the fact that the quantity used as activity is already computed as part of the standard filtering described.

The described filtering function may be implemented by generating an activity metric at activity metric function 400, which applies its output to filter selector 302, to select an appropriate filter for spatial filter 104.

FIG. 7 shows a flowchart of the adaptive filtering method. At step 300, a small area activity metric $a_s$ is computed, conveniently using the absolute value of the small area filter calculation. At step 302, if the small area activity $a_s$ falls outside a medium range, the small area filter is used (step 304). If $a_s$ falls within the range, a large area activity $a_L$ is computed at step 306, again conveniently using the absolute value of the large area filter calculation. At step 308, values of the activity metrics are compared. If the ratio of the two activity metrics $a_s/a_L$ is larger than a specified threshold $T_3$, a small filter is used at step 310; otherwise a large filter is used at step 312. It should be noted that re-normalization constants in the activity metrics based on the filter size have been omitted.

The required filters vary with the object or image type of the input, but simple activity measures as described above are sufficient to select the appropriate filters. It should be clear that the selection between two discrete filters was chosen for simplicity and speed and that in the general case the activity measure can be used to derive a filter or to smoothly blend between a number of pre-selected filters.

It will no doubt be appreciated that the present invention can be accomplished through application software accomplishing the functions described, to operate a digital computer or microprocessor, though a hardware circuit, which will probably provide optimum speed, or though some combination of software and hardware.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of selecting a filter for control of a gamut mapping correction process, including:
    determining a filter selection metric in accordance with measured local image activity;
    changing filter parameters as a function of the determined filter selection metric; and,
    using the changed filter parameters so that luminance feedback in a gamut mapping correction process is in accordance with local image activity.

2. A method as described in claim 1, wherein said local image activity metric varies between low activity, corresponding to flat areas within an image, and high activity, corresponding to strong edge areas with an image.

3. A method as described in claim 2, wherein said image activity corresponds to a data norm of order p, given by $$\text{Activity} = \left[\sum_j (e_i^p - e_j^p)\right]^{\frac{1}{p}}.$$

4. A method as described in claim 2, wherein said image activity corresponds to $$\frac{1}{m}\left|\sum_j (e_i - e_j)\right|.$$

wherein $e_i$ is a luminance error at a target pixel i and $e_j$ is a luminance error at a pixel j within a neighborhood of pixel i, and m is the number of pixels in the neighborhood.

5. A method as derived in claim 1 wherein said varied filter parameter is filter size in terms of pixels covered in a single operation thereof.

6. A method as derived in claim 1, wherein the filter selection metric and fitter parameters are derived as follows:
    computing said activity metric within a small pixel neighborhood neighborhood defined as $N_5 \times N_5$
    for activity metric values within a predetermined range of activity values, employing a relatively small filter size $S_1 \times S_1$ for activity metric values outside said predetermined range of activity, computing a activity metric $a_l$ over a large pixel neighborhood $N_l \times N_l$ compute the ratio $R = a_l/a_s$ If R is greater than a predetermined threshold, employ a small filter size $S_1$ If R is less than the said threshold, employ a large filter size $S_2 \times S_2$.

7. A method as in claim 6 wherein $N_s=5$, $N_l=15$, $S_1=5$, and $S_2=15$.

8. A method of selecting a filter for control of a gamut mapping correction process, comprising:

determining a filter selection metric in accordance with measured local image activity, wherein said local image activity metric varies between low activity, corresponding to flat areas within an image, and high activity, corresponding to strong edge areas with an image, said image activity corresponding to a data norm of order p, given by $$\text{Activity} = \left[ \sum_j (e_i^p - e_j^p) \right]^{\frac{1}{p}};$$

and, changing filter parameters as a function of the determined filter selection metric.

9. A method of selecting a filter for control of a gamut mapping correction process, comprising:

determining a filter selection metric in accordance with measured local image activity, wherein said local image activity metric varies between low activity, corresponding to flat areas within an image, and high activity, corresponding to strong edge areas with an image, said image activity corresponds to $$\frac{1}{m} \left| \sum_j (e_i - e_j) \right|$$

wherein $e_i$ is a luminance error at a target pixel i and $e_j$ is a luminance error at a pixel j within a neighborhood of pixel i, and m is the number of pixels in the neighborhood; and, changing filter parameters as a function of the determined filter selection metric.

10. A method of selecting a fitter for control of a gamut mapping correction process, comprising:

determining a filter selection metric in accordance with measured local image activity metric; and, changing filter parameters as a function of the determined filter selection metric, the filter selection metric and filter parameters being derived as follows:

computing said image activity metric within a small pixel neighborhood, the neighborhood defined as $N_s \times N_s$ for image activity metric values within a predetermined range of activity values, employing a relatively small filter size $S_1 \times S_1$ for image activity metric values outside said predetermined range of activity, computing an activity metric $a_L$ over a large pixel neighborhood $N_l \times N_l$ compute the ratio $R = a_L/a_s$ if R is greater than a predetermined threshold, employ a small filter size $S_1$ if R is less than the said threshold, employ a large filter size $S_2 \times S_2$.

11. A method as in claim 10 wherein Ns=5, Nl=15, S1=5, and S2=15.

* * * * *